United States Patent [19]

Nolan, Jr. et al.

[11] 4,175,620

[45] Nov. 27, 1979

[54] METHODS AND APPARATUS FOR ANCHORING OFFSHORE PIPELINE

[75] Inventors: Clyde E. Nolan, Jr., Houston; William S. Tillinghast, Humble, both of Tex.

[73] Assignee: Brown & Root, Inc., Houston, Tex.

[21] Appl. No.: 857,981

[22] Filed: Dec. 6, 1977

[51] Int. Cl.² .............................................. E21B 7/12
[52] U.S. Cl. ................................. 166/343; 166/352; 405/169
[58] Field of Search ............... 166/339, 343, 347, 341, 166/342, 346; 61/105, 107, 110, 111, 112; 405/169

[56] References Cited

U.S. PATENT DOCUMENTS

| | | | |
|---|---|---|---|
| 3,604,731 | 9/1971 | Petersen | 166/347 |
| 3,701,261 | 10/1972 | Nolan, Jr. | 166/343 X |
| 3,732,923 | 5/1973 | Fowler | 166/339 X |
| 3,775,986 | 12/1973 | Daughtry | 166/343 X |
| 3,846,992 | 11/1974 | Liautaud | 61/110 |
| 4,075,862 | 2/1978 | Ames | 166/343 X |

FOREIGN PATENT DOCUMENTS

7606325  6/1975  Netherlands ..................... 61/111

Primary Examiner—James A. Leppink
Assistant Examiner—Richard E. Favreau
Attorney, Agent, or Firm—Kenway & Jenney

[57] ABSTRACT

An offshore pipeline installation comprises a wellhead base and a pipeline anchor connected together to form a unit which is lowered onto a seabed. The anchor is pivotably positionable relative to the wellhead base about a vertical axis of a pilot tube. A pin pile is inserted through the tube and into the seabed to isolate the pipeline anchor from the wellhead and wellhead base in relation to forces generated in anchoring a pipeline to the pipeline anchor. The anchor is selectively positionable for alignment with pipeline means to be laid, and may include a socket mounted for pivotal movement about one or more, axis. The socket is operable to receive pipeline means laid away from the anchor. The anchor may further include a ramp which is inclined relative to horizontal. The ramp is positionable generally laterally relative to the lay path of the pipeline means so that pipeline means laid upon the ramp gravitates downwardly toward clamp means at the foot of the ramp.

20 Claims, 19 Drawing Figures

METHODS AND APPARATUS FOR ANCHORING OFFSHORE PIPELINE

BACKGROUND AND OBJECTS OF THE INVENTION

This invention relates to offshore well completions and, more particularly, to the securement of pipelines to subsea wellheads.

In the construction of offshore wells, such as for the recovery of petroleum or natural gas, a well is drilled and pipelines are connected to the wellhead for conducting petroleum or natural gas to a collecting station. The actual hook-up of the pipelines must be made on the seabed. Considerable effort and difficulty is involved in accurately positioning the pipelines relative to the wellhead and performing the necessary connection activities. Proposals have been made for facilitating such operations, as exemplified in Otteman et al. U.S. Pat. Nos. 3,378,066 issued Apr. 16, 1968, Peterson 3,604,731 issued Sept. 14, 1971, Nolan 3,701,261 issued Oct. 13, 1972, Daughtry 3,775,986 issued Dec. 4, 1973, and Liautand 3,846,992 issued Nov. 12, 1974.

Some prior systems utilize a pipeline anchor which is attached directly to the wellhead or the wellhead base, and which receives and secures the pipelines for subsequent connection to the wellhead. One problem associated with such an arrangement is that undue stress may be imposed on the wellhead during subsequent pipeline hook-ups or pipe laying operations due to the anchoring of the anchor by means of the wellhead. Moreover, many anchors of this type cannot be easily repositioned to coincide with the pipeline orientation. Such systems are also vulnerable to stresses imposed by thermally induced changes in pipeline length.

In cases where pipelines are laid away from the wellhead, anchors have been proposed whereby the pipeline can be pulled by cable to the anchor for proper alignment and securement. However, such anchors are of no utility in cases where pipeline means are laid toward (rather than away from) the wellhead.

While many pipeline-to-anchor hook-ups are intended to be conducted by remote control from a surface vessel, these procedures are expensive and complex and are not needed at shallower depths which are accessible to divers. At shallower depths, then, it would be desirable to simplify diver efforts in pipeline-to-wellhead hook-up.

It is, therefore, an object of the present invention to minimize or obviate problems of the type discussed above.

It is another object of the invention to provide novel methods and apparatus for securing offshore pipeline to subsea installations.

It is a further object of the invention to simplify diver efforts during the hook-up of pipelines to subsea wellheads.

It is an additional object of the invention to enable subsea pipeline hook-ups to be made without imposing loads that cause undue stress on a wellhead and in such a manner as to tend to isolate thermally induced pipeline stress from a wellhead.

It is yet another object of the present invention to provide a novel subsea flowline anchor which can be reoriented subsequent to being positioned on the seabed, and/or prior thereto.

It is a further object of the invention to provide a novel subsea flowline anchor which selectively facilitates the hook-up of pipelines laid either toward or away from the wellhead.

It is one additional object of the present invention to provide a flowline anchor which is secured to the seabed for positioning relative to the wellhead by means of a pin pile which isolates the wellhead from forces generated in anchoring flowlines to the anchor and from thermally induced pipeline stress.

It is yet another object of the present invention to provide a selectively positionable subsea flowline anchor which includes an inclined ramp for receiving pipeline means laid toward a wellhead, and a pivoted socket for receiving pipeline laid away from the wellhead.

BRIEF SUMMARY OF THE INVENTION

In accordance with the present invention a wellhead base and a pipeline anchor are connected so as to form a unit which is lowered onto a seabed. The anchor is movably positionable relative to the wellhead base. A pin pile is connected with the anchor and inserted into the seabed to isolate the wellhead from the pipeline anchor in relation to forces generated in anchoring a pipeline to the pipeline anchor and in relation to thermal (or other) pipeline stresses.

An improved pipeline anchor may also be provided which is selectively positionable for alignment with pipeline being laid. The anchor may include a socket mounted for pivotal movement about one or more axis. This socket would be operable to receive pipeline means laid away from the anchor. The anchor may further include a ramp which is inclined relative to horizontal. This ramp is positionable generally laterally relative to the lay path of the pipeline so that pipeline means laid upon the ramp gravitates downwardly therealong.

Of further independent significance is a concept, presented herein, whereby a pipeline anchor is substantially isolated from force transmitting communications with a wellhead during connecting of a pipeline with the pipeline anchor and thereafter.

THE DRAWINGS

Preferred embodiments of the present invention are described hereafter by way of example, but no limitation. Such embodiments are described in detail in conjunction with the accompanying drawings in which like numerals designate like elements and in which.

DETAILED DESCRIPTION

Summary of Subsea Assembly

A subsea well assembly 10 according to the present invention is depicted in FIGS. 1-4.

The well assembly 10 comprises a flowline installation 12, a pin pile 14 for anchoring the flowline installation 12, and a Christmas tree (i.e., assembly of wellhead valves and/or control means) 16 mounted on the flowline installation 12.

Figure 5:
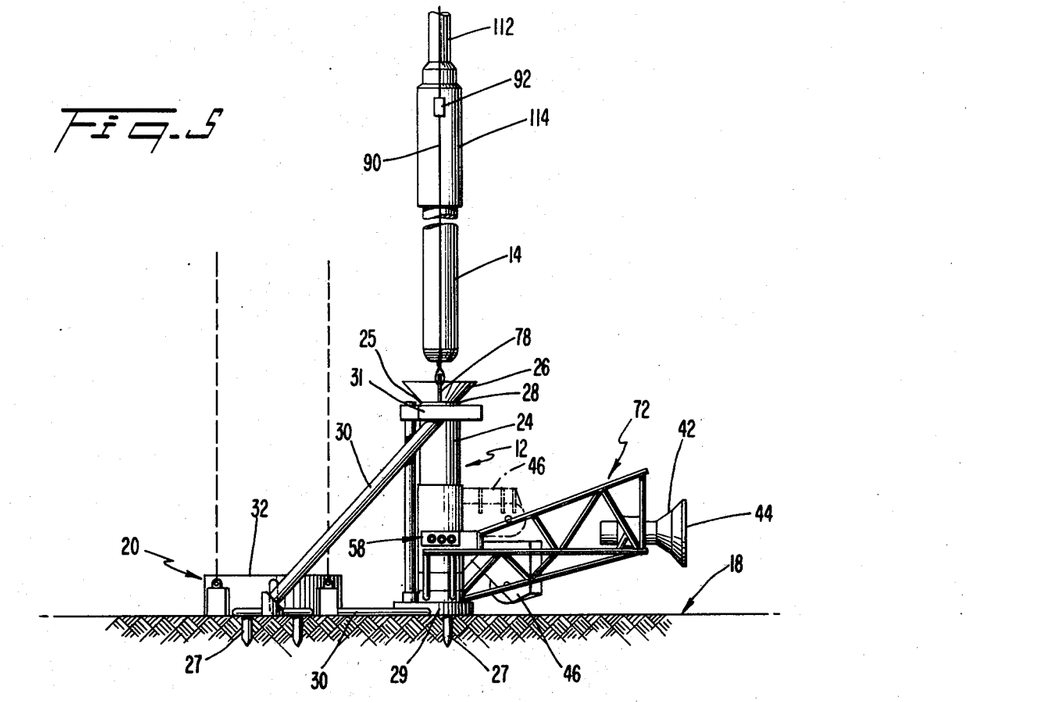
FIG. 5 is a side elevational view of the pipeline installation, without the wellhead being connected thereto, with a pin pile disposed for insertion.

In FIG. 5, the flowline installation 12 is depicted after having been lowered and positioned on the seabed 18 and prior to being permanently secured to the seabed and prior to receiving the Christmas tree 16 or other wellhead components.

The flowline installation 12 comprises a wellhead temporary guide base assembly portion 20 and a pipeline anchor portion 22. The temporary guide base assembly 20 includes a template 32 for guiding the well drilling operation, and supporting a permanent base 80 and also the "Christmas tree" 16 and other portions of the wellhead which are later installed.

The pipeline anchor 22 guides pipelines into position and anchors the pipelines so that intermediate conduits, preferably prefabricated flowline loops, can be connected between the pipeline ends and the wellhead, as will be discussed below.

The anchor 22 is rigidly connected to an open-ended pivot sleeve 24. Sleeve 24 houses a pilot tube or conduit 25 which has a pin pile guide funnel 26 at its upper end and which is fixed to unit 12 by appropriate framing. Sleeve 24 is journaled on pilot tube 25 between upper and lower collars 28, 29 so that sleeve 24 is rotatable about the vertical axis of tube 25. Support arms 30 extend between the guide base assembly 20 and the collar 28. Other support arms 30a (FIG. 4) extend between guide base assembly 20 and collar 29. The wellhead temporary base 20 and pipeline anchor 22 are thus connected together as a unit for simultaneous lowering and positioning on the seabed, with relative rotational movement permitted therebetween. A plurality of pointed cleats 27 may project from the template 32 and the lower collar 29 and be embedded within the seabed to resist shifting movement of the temporary base 20 and collar 29.

The installation unit 12 is lowered from a furface vessel, such as a barge, or drilling rig, in any suitable fashion. For example, the unit may be secured at the lower end of a drill string which is detachably connected to tube 25. Once being situated on the seabed, the unit 12 is released from the drill string and is fixed or anchored to the seabed, using release mechanisms of the type employed in well drilling, completion and/or servicing.

Figure 16:
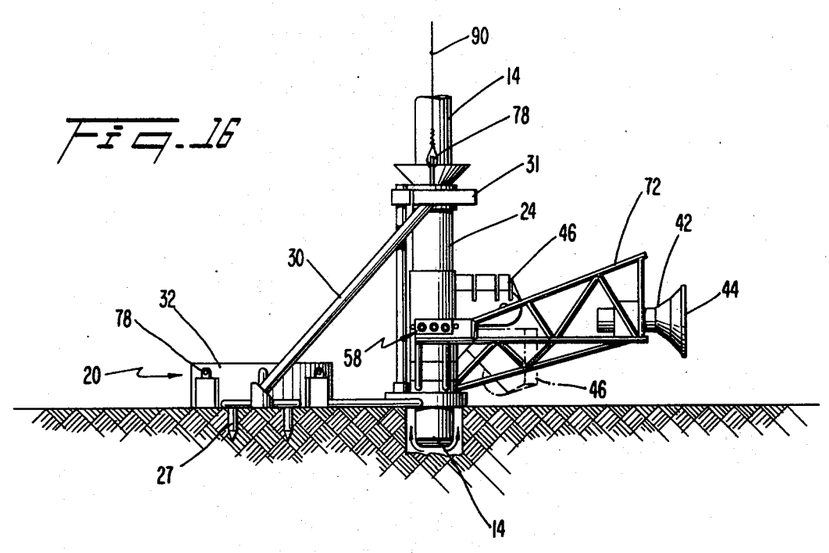
FIG. 16 is a side elevational view depicting a sequence in the insertion of the pin pile within the seabed.

Anchoring of the installation 12 may be accomplished in a manner permitting rotation of the anchor 22 about a vertical axis, so that the anchor can be selectively oriented relative to a pipeline that is to be connected to the anchor. The anchoring of the installation 12 can be achieved in numerous ways, it being preferably that the pin pile 14 be inserted through the tube 25 and secured in the seabed. This can be accomplished by various conventional techniques. For example, as shown in FIG. 5, a tubular pin pile 14 may be lowered on a placement tool 114 which may be carried at the lower end of a conventional drill string 112. Once the pin pile 14 has been lowered through the tube 25, water may be ejected through the drill string and the placement tool 114 and travel downwardly through the center of the tubular pin pile and then upwardly around the outer periphery of the pin pile (FIG. 16). When the pin pile is sufficiently embedded, grouting material may be conducted through the drill string and the interior of the pin pile into the annulus therearound. Thus, the pin pile may be permanently secured within the seabed. If desired, mechanical latching means, such as slips carried by collars 28 and 29, may be employed to anchor tube 25 to pile 14. Such slips may be actuated, by conventional well tool means carried by the placement tool 114. The placement tool may then be disconnected from the pin pile by any suitable release mechanism, such as a reverse rotation release or an internal, pressure-actuated latch.

When the installation unit 12 has been secured by the pin pile 14 to the seabed, the temporary base 20 will be held stationary, against shifting movement, by the cleats 27, thereby enabling the connected pivot sleeve 24 and pipeline anchor 22 to be rotated about the axis of the pin pile 14 relative to the temporary base 20. The pipeline anchor 22 can thus be suitably oriented by divers, using appropriate tools and/or power means, for receiving pipeline means being laid in a wide range of directions.

While sleeve 24 may be fixed to tube 25 with appropriate fastening means during pipeline laying operations, it may remain pivotable for pipeline connecting operations, so as to remove loads which cause stress and to facilitate flow line insertion in the unit. Preferably, the desired orientation of anchor 22 will have been pre-set prior to lowering unit 12.

Any stresses which are imparted to the pipeline anchor during the connection of pipelines, or during subsequent laying operations, or as a result of thermally induced or other pipeline stresses, will be resisted by the pin pile 14 and thus substantially isolated from wellhead base 80. The base 80 is thus isolated relative to such forces and less subject to damage resulting therefrom.

Pipeline Anchor

The pipeline anchor portion 22 of the flowline installation unit 12 preferably includes guide elements for guiding and securing pipeline means which are laid either toward or away from the installation.

Figure 1:
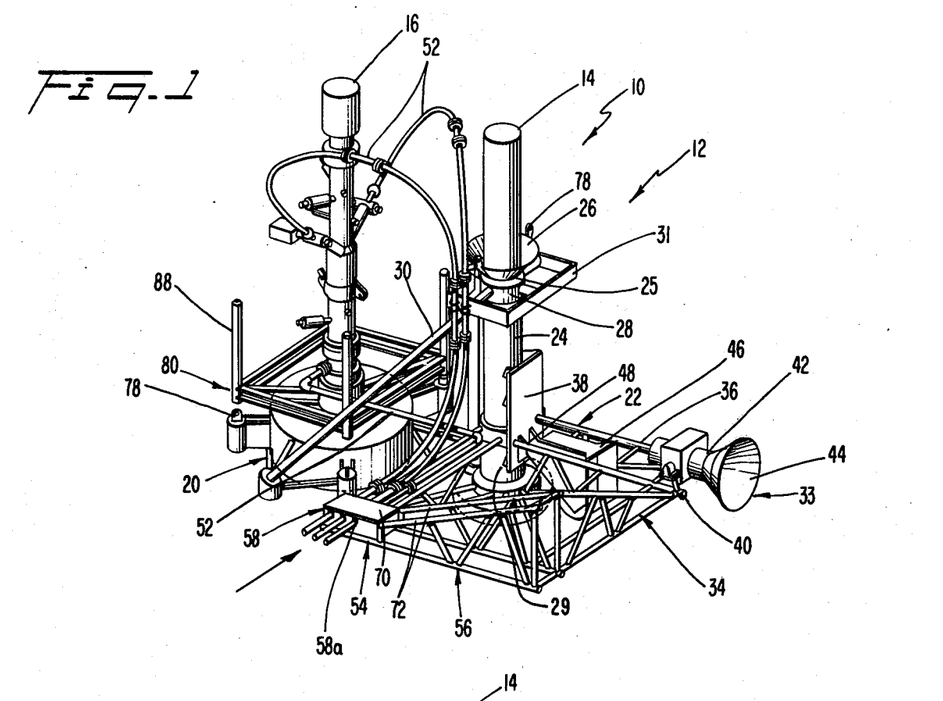
FIG. 1 is a perspective view of a wellhead and a pipeline installation according to the present invention, showing hook-ups between the wellhead and pipelines laid toward the wellhead.

As shown in FIG. 1, the "laying away" guide and securing structure 33 may comprise a metal framework 34 which includes a pair of links 36. These links 36 are secured at their inner ends to a plate 38 which is fastened to the pivot sleeve 24. Connected to outer ends of the links 36 are aligned pivot bearings 40 which receive pivot pins or stub axles of an open-ended guide socket or funnel 42. This arrangement provides a horizontal pivot axis for the socket 42. The guide socket 42 may include a pull-in guide funnel mouth 44 at its outer end through which a pipeline or pipeline bundle may be inserted. Guide socket will also include latching means operable to receive the end of pipeline means thereto.

Figure 6:
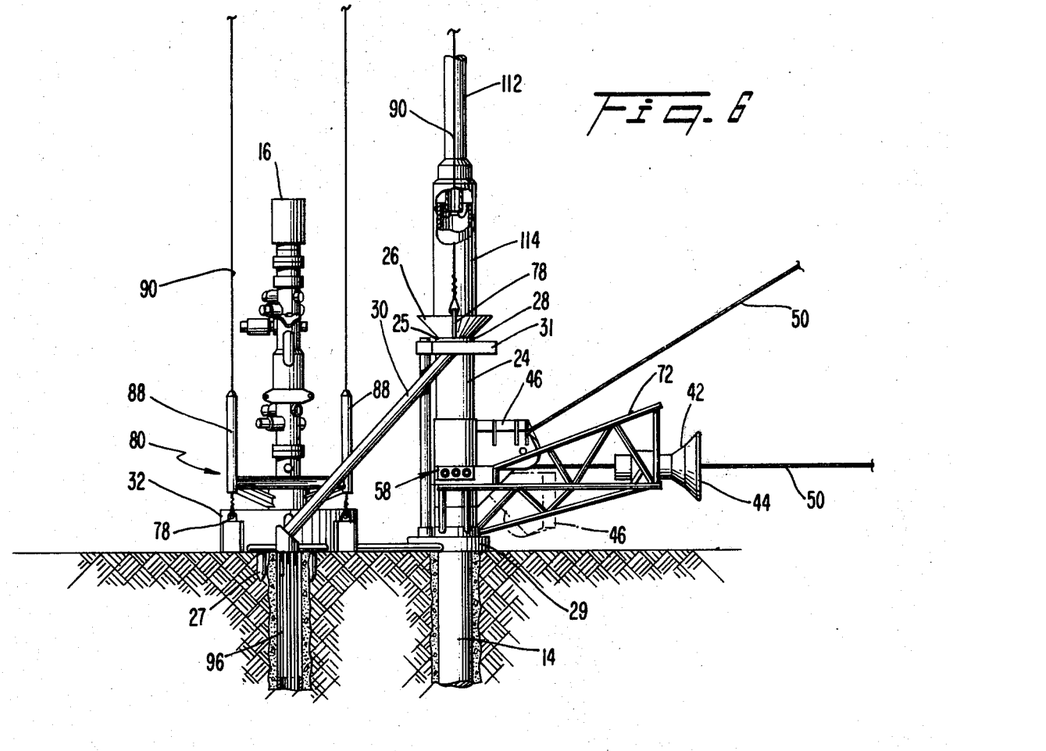
FIG. 6 is a view similar to FIG. 5 with the pin pile grouted to the seabed, a well having been drilled, and a "Christmas tree" installation mounted on the pipeline installation.
Figure 7:
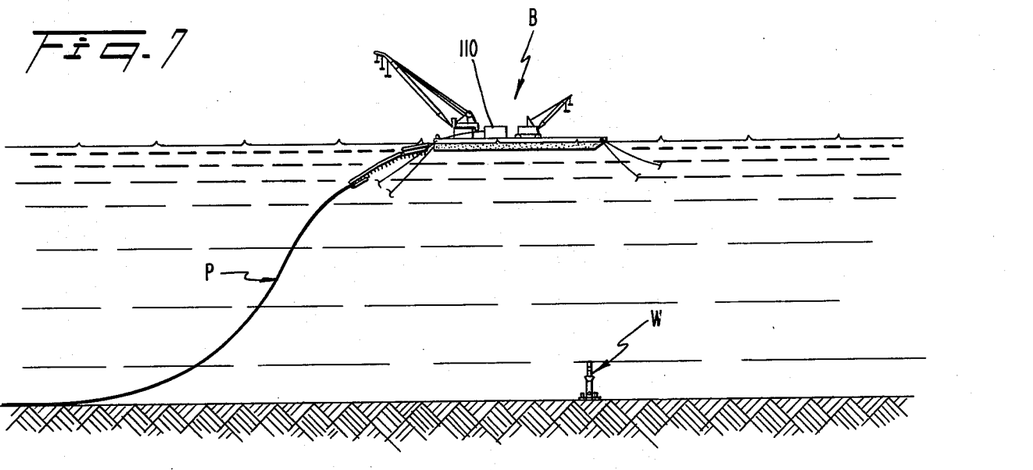
FIGS. 7 through 11 are schematic views depicting sequences in which pipeline is laid toward the wellhead and installation.

A pivotable sheave 46 may be attached to the plate 38, which sheave is swingable about a pivot mounting 48 between an upper operable position (solid lines in FIG. 6) and a lower inoperable position (broken lines in FIGS. 5-6). In its operable position the sheave 46 is adapted to receive a cable 50 (FIG. 6) by means of which a pipeline means (single line or bundle) can be pulled, from a floating barge, through the socket 42 and into latched cooperations therewith. Thereafter, with the pipeline means secured to the anchor 22, the sheave 46 can be swung to an inoperable position to permit the pipeline means to be coupled to the wellhead by means of prefabricated flowline loop sections 52. As shown in FIG. 1, a bracket 31 may be connected with collar 28, and serve to support coupling sections 52.

The pipeline anchor 22 may further include a "laying toward" guide structure 54 which comprises a metal framework 56 connected to the pilot sleeve 24. Mounted on this framework 56 may be a clamp mechanism 58 which is operable to receive and clamp pipelines. The clamp mechanism can be of any suitable arrangement. Preferably, the clamp mechanism 58 comprises upwardly facing sockets or recesses 58a into which pipeline ends may be inserted and clamped. A clamp cover 70 may be pivotably mounted so as to enclose the clamped pipelines when shut, as shown in FIG. 1.

Whether the "pull in" socket 42 or clamp 58 is employed, anchor 22 will preferably be rigidly connected to pipeline ends so as to provide a terminus on anchor 22 operable to impede the transmission of stress from the pipeline means to the wellhead.

The framework 56 may further comprise a pair of links 72 which are reinforced by diagonal members and which are inclined upwardly from the plane of the clamp 58 in a direction extending generally laterally relative to the lay path of the pipeline. These links 72 define an inclinded ramp or indexing jig upon which pipeline may be placed. The angle of inclination of the ramp relative to horizontal is steep enough to cause pipeline placed on the ramp to gravitate downwardly toward the clamp 58. The ramp thus provides an extended target area for receiving the pipeline and thus avoids the necessity of having to lower the pipeline precisely into the clamp 58 from the barge.

Well Completion and Pipeline Anchoring

Padeyes 78 may be provided on the pilot tube 25 and the temporary base 20 for connection to guide cables which aid in lowering and positioning of the pin pile 14 and the permanent wellhead base 80 and Christmas tree 16 during lowering of these elements.

After the flowline installation unit 12 has been placed on the seabed and anchored by the pin pile 14, conventional drilling techniques are employed to drill the well and install wellhead equipment, such as a wellhead permanent base 80, a blow-out preventer and the Christmas tree 16 on base 20. As shown in FIG. 6, base 80 may be guided into position by guidelines 90.

With base 80 installed, conventional guide line controlled well drilling and completion techniques may be employed to complete well 96 (FIG. 6). Thereafter, Christmas tree 16 may be installed, again using guidelines 90.

At this point, the unit 12 is prepared to receive a pipeline bundle P (or a single pipeline). The anchor 22 is able to be swung about the pin pile axis by a diver using appropriate tools or power devices to properly position the anchor relative to the pipeline bundle. The pipeline bundle (or single pipeline), if it is to be laid away from the wellhead, is initially pulled through the guide sleeve 42 and secured thereto in suitable fashion. For example, an automatically engageable coupling can be provided such as of the type disclosed in the aforementioned Nolan U.S. Pat. No. 3,701,261. As a result, the pipeline bundle (or single pipeline) is secured to the socket in response to being pulled into the latter.

If, on the other hand, the pipeline means is to be laid toward the wellhead, the ramp 72 is operable to receive and guide the pipeline means toward the clamp 58, to which the pipeline means is to be connected by a diver.

When the pipeline means is coupled to the anchor 22, the prefabricated flowline loops 52 can be suitably coupled between the wellhead equipment.

Figure 17:
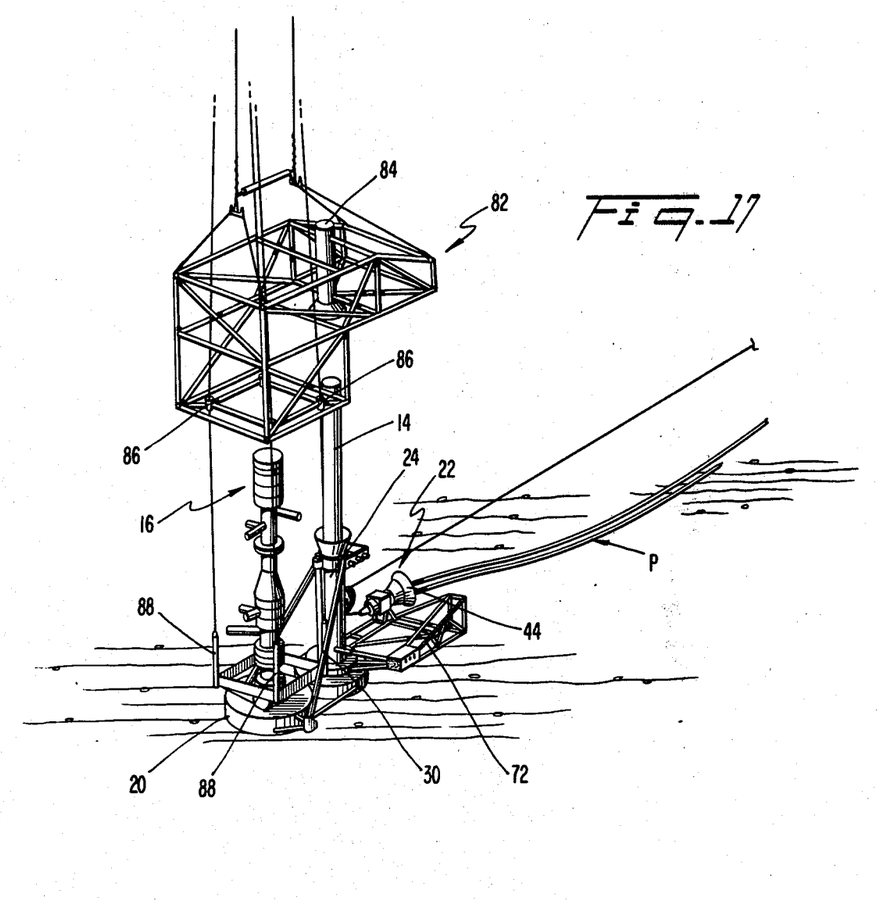
FIG. 17 is a perspective view of a diver's work enclosure being lowered around the pipeline installation.

It is envisioned that hook-up of the prefabricated flowline loops 52 will be accomplished by a diver. Accordingly, a work enclosure 82 may be provided for carrying various tools and equipment for use in this operation (FIG. 17). The work enclosure 82 is lowered from a service barge and may comprise an open framework having an alignment tube 84 and a plurality of alignment sockets 86. The alignment tube 84 receives the upper end of the pin pile 14, and the alignment sockets 86 receive upstanding posts 88 affixed to the permanent base 80. In this fashion, the work enclosure will be accurately oriented relative to the installation unit. The enclosure carries the preformed flowline loops 52 as well as various tools, such as padeyes, chain falls, diver footings, etc. (not depicted in FIG. 17) to facilitate hook-up operations.

Figure 2:
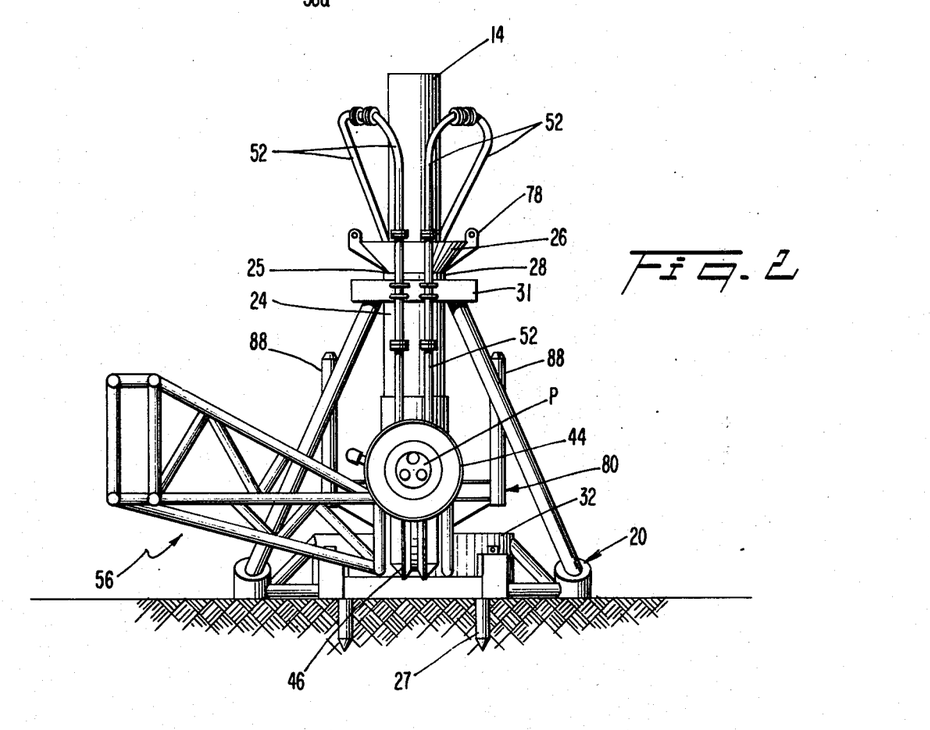
FIG. 2 is a side elevational view of a portion of the pipeline installation, showing hook-ups between the wellhead and pipelines laid away from the wellhead.
Figure 3:
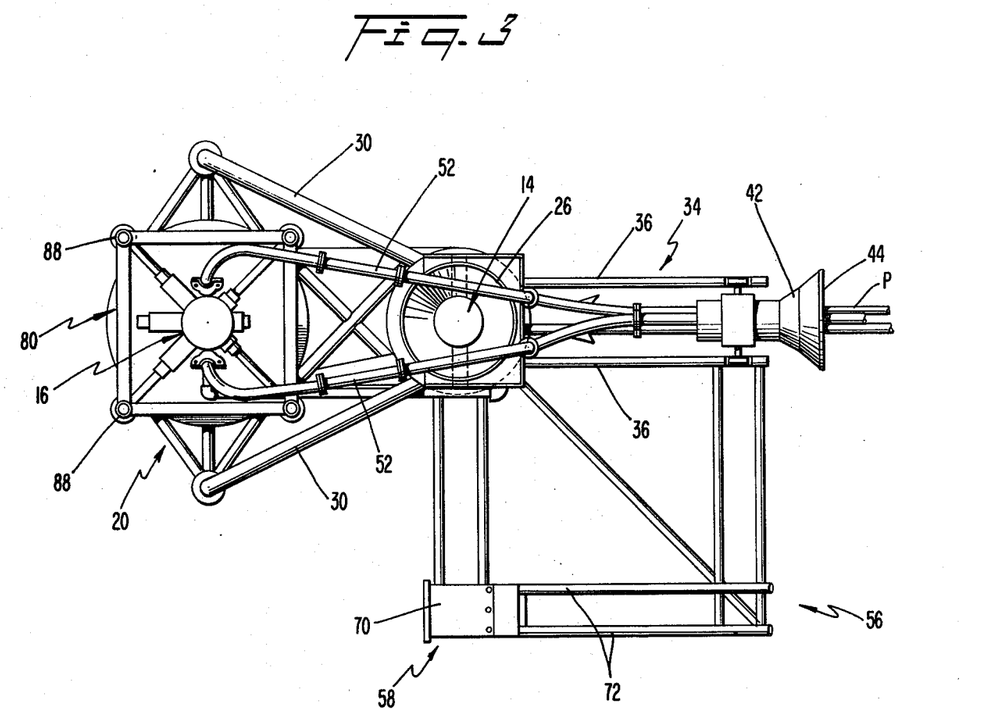
FIG. 3 is a plan view of the installation, rotated 90°, and showing the hook-ups as in FIG. 2.
Figure 4:
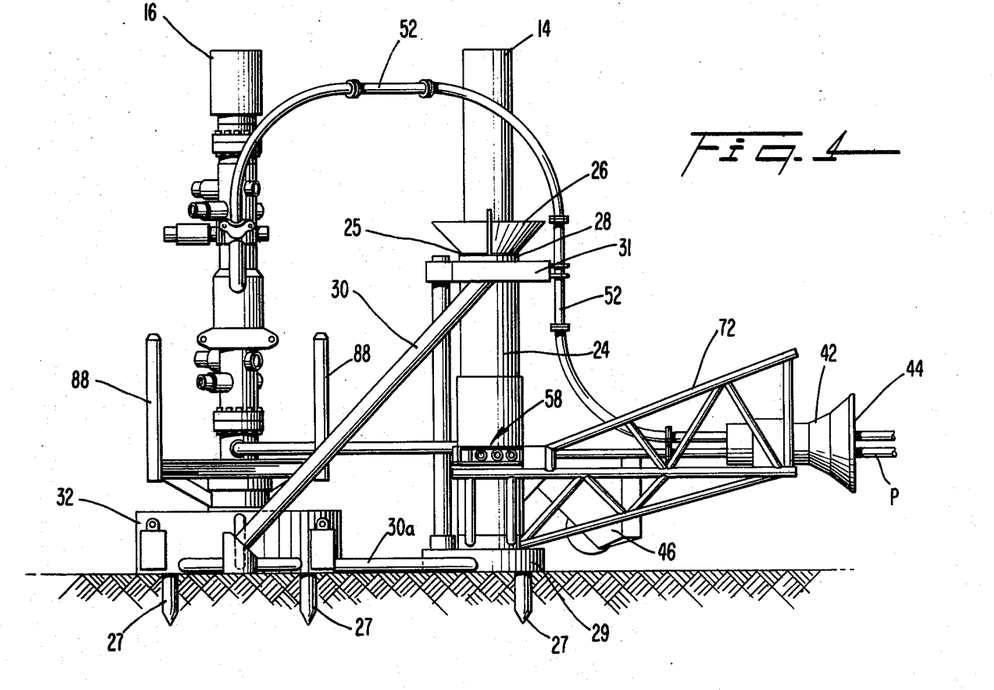
FIG. 4 is a side elevational view of another portion of the installation, showing hook-ups as in FIG. 2.
Figure 18:
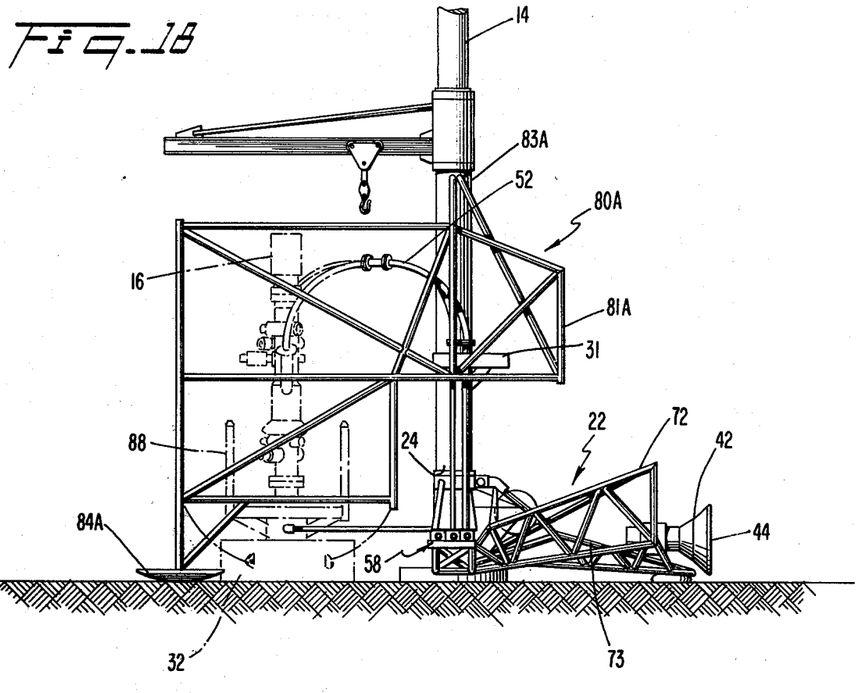
FIG. 18 is a side elevational view of an installation depicting a modified arrangement of a diver's work enclosure.

The flowline loop hook-up arrangement for pipelines that have been laid away from the wellhead is depicted in FIGS. 2, 4 and 17 and that for a pipeline laid toward the wellhead is shown in FIGS. 1, and 18. For added securement, an intermediate one of the flowline loops 52 may be connected to the bracket 31 which is mounted on the collar 28.

Figure 19:
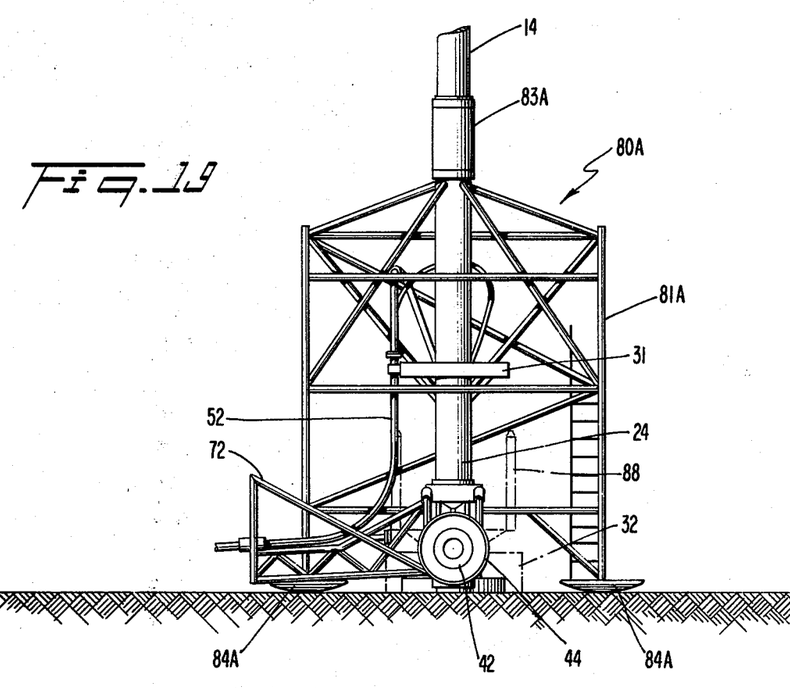
FIG. 19 is a side elevational view of a different portion of the structure depicted in FIG. 18.

Alternatively, the diver's work enclosure may be integrally formed with the flowline installation unit 12, as depicted in FIGS. 18 and 19. This integrally formed work enclosure 80A includes a framework 81A. A sleeve 83A is connected to the framework 81A and receives an upper end of the pin pile 14. An outer end of the framework is supported by a skid 84A which rests on the seabed.

In the FIG. 18-19 embodiment, socket 42, guide 72, and clamp 58 are again mounted on a pivot sleeve 24. However, the socket 42 may be carried by framing 73 which is carried by pivot sleeve 24 and mounted for selectively adjustable, vertical pivoting movement. Such movement would enable the elevation of funnel or socket 42 to be adjusted.

SUMMARY OF INSTALLATION AND HOOK-UP PROCEDURE

Once a suitable subsea drilling site has been located, the flowline installation unit 12, including the wellhead temporary base 20, pipeline anchor 22, and pivot sleeve 24, is lowered onto the seabed. This can be accomplished in various ways, such as by lowering the unit on the end of a conventional drill string 112. As the unit settles within the seabed, the cleats 27 on the temporary base assembly 20 penetrate the seabed and resist shifting of the temporary base.

The pin pile 14 is inserted through the pilot tube 25 and is rigidly affixed to the seabed. The pivot sleeve 24 is rotatable about the vertically disposed longitudinal axis of the secured pin pile 14, while rotation of the temporary base 20 is prevented by the cleats 27.

With the installation unit 12 situated in this manner, a well 96 is drilled in conventional fashion through the template 32. Thereafter, appropriate wellhead structure, including the permanent base 80 and the Christmas tree 16, is installed onto the temporary base.

Pipelines can be coupled to the pipeline anchor 22 no matter whether being laid toward or away from the wellhead. Moreover, the anchor 22 may be swung around the pin pile axis for alignment with the lay path of the pipeline. A swing-arc of about one-hundred forty degrees is anticipated.

Lay Toward Procedure Summary

During the laying of pipeline bundle P toward the installation unit (FIGS. 7–11), the indexing ramp 72 is utilized. The anchor 22 is swung about the pin pile axis, if necessary, so that the clamp 58 is generally aligned with the lay path. Accordingly, the indexing ramp 72 will then extend generally laterally of the lay path.

Figure 8:
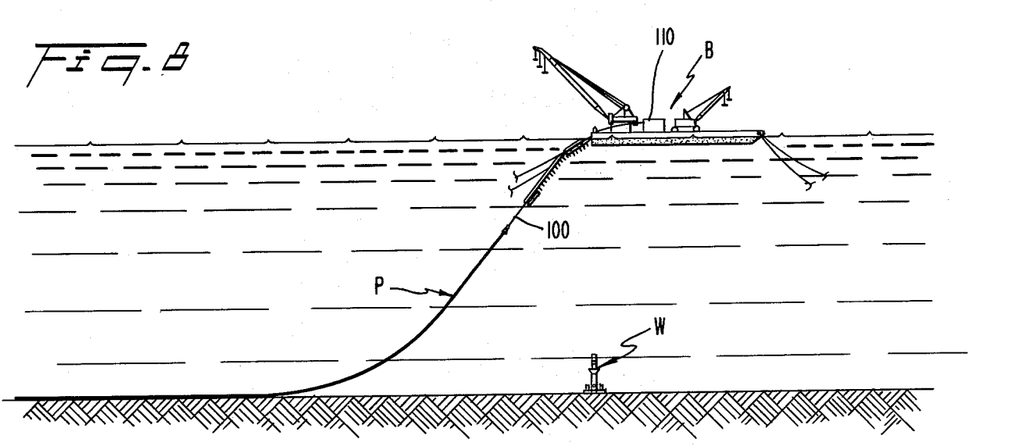
Figure 9:
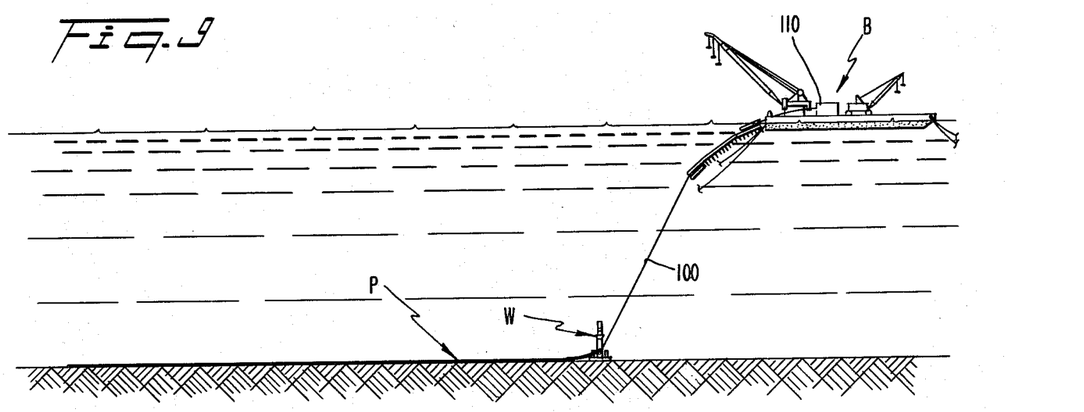

As the pipeline bundle P approaches the wellhead W, it is lowered from the barge B by means of a tension cable 100 (FIG. 8). Thereafter, a diver may be lowered in a diving chamber 102 (FIG. 10) to inspect the relationship between the end of the pipeline bundle and the wellhead. If the pipeline is too long, the diver marks the pipeline bundle at a proper cut-off point, the pipeline bundle is raised onto the barge and cut, and then lowered again onto the installation unit (FIG. 9). If the pipeline is too short, it may be lengthened on this barge.

Figure 10:
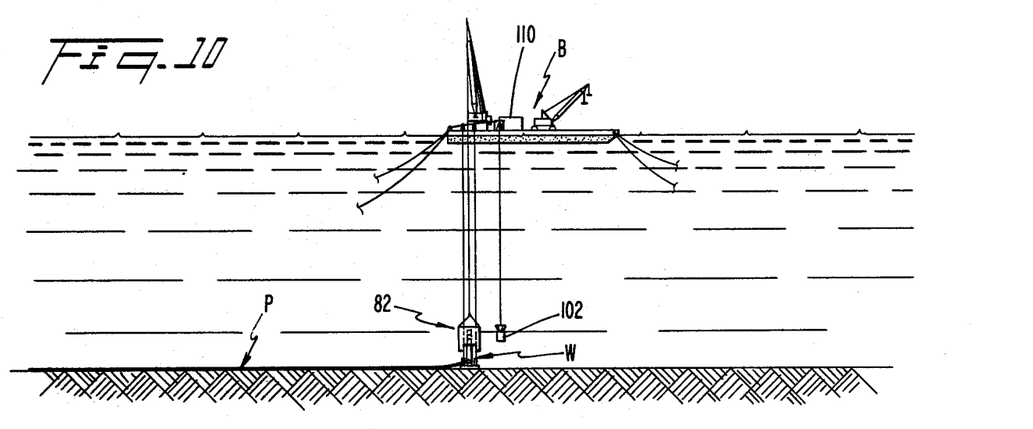
Figure 11:
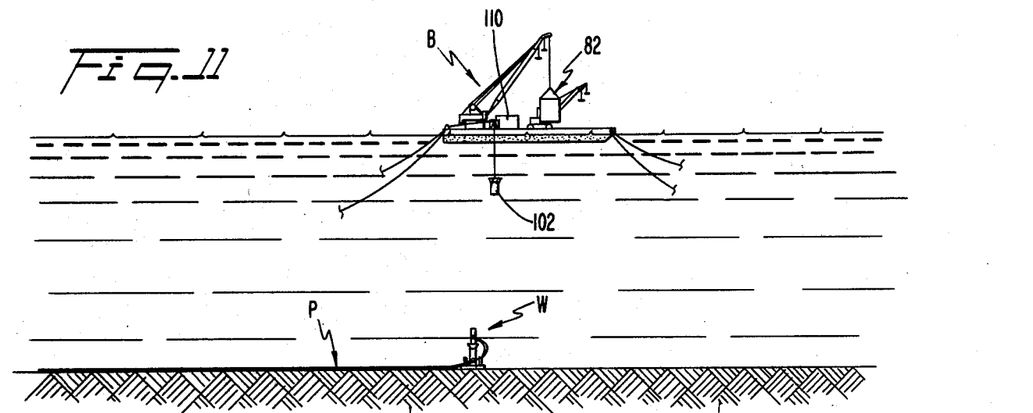

Proper reception of the pipeline bundle on the anchor 22 is facilitated by the ramp 72 which provides an enhanced target area. Due to the sloping nature of the ramp, the pipeline bundle tends to slide into the clamp housing. The diver then secures the individual pipelines to the clamp means 58. The diver's work enclosure 82 is then lowered into position on the installation unit (FIG. 10). The enclosure carries preformed flowline loops 52 and equipment for handling and securing the flowline loops. The diver proceeds to connect the flowline loops between the clamped pipeline ends and the wellhead equipment.

Stresses which may be imposed on the flowline anchor 22 are not transmitted to the wellhead, but rather are resisted directly by the pin pile 14.

Thereafter, the diver and work enclosure are returned to the barge and the wellhead is set for operation.

Lay Away Procedures Summary

Figure 12:
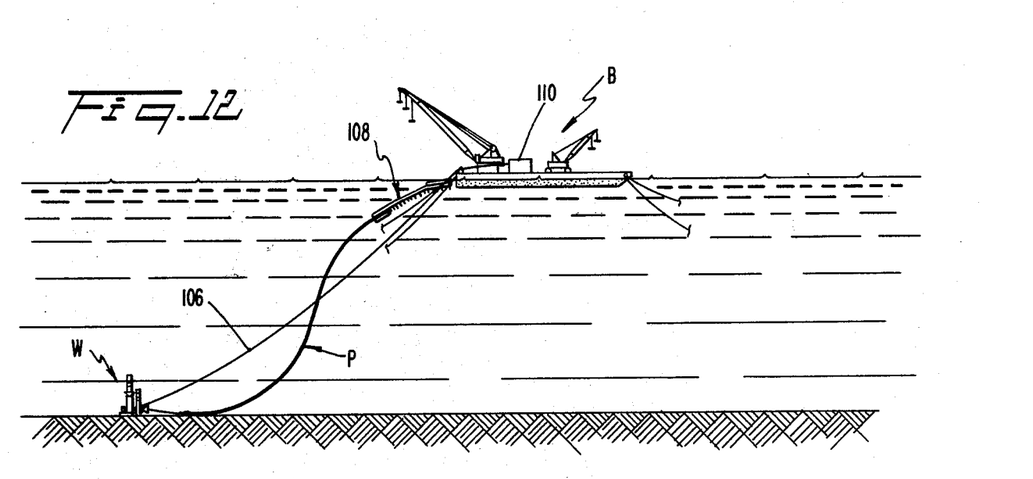
FIGS. 12 through 15 are schematic views depicting sequences in which pipeline is laid away from the wellhead and installation.

If the pipeline means P is to be laid away from the wellhead W (FIG. 12–15), then the laybarge B is initially positioned close to the wellhead and divers descend to the wellhead. The sheave 46 is swung upwardly to its operable position and a messenger cable is run from the barge through the guide socket 42, around the sheave 46, and back to the barge for attachment to a winch. The anchor 22 may be swung about the pile pin axis to properly position the guide socket 42 for receiving the messenger cable. A wire rope 106 is connected to the messenger cable and the messenger cable is taken-up by the winch to pull the wire rope 106 through the guide socket 42. The wire rope 106 is connected to the pipeline means P (FIG. 12), the latter being rendered operable to be pulled into the guide socket 42. The guide socket 42 is able to pivot about its horizontal swing axis to align itself with the pipeline means. Proper tension is maintained on the pipeline means P by a tension winch 110 on the barge and the pipeline means may be supported by buoyant ramp 108 or "stinger" means, connected with lay barge B. The front end of the pipeline means may comprise a suitable locking and socketing structure which automatically connects to the socket 42, generally as in the manner described in the aforementioned Nolan patent, for example. Pulling line 106 may be "buoyed off" at the water surface (FIG. 13) to mark the wellhead location.

Figure 13:
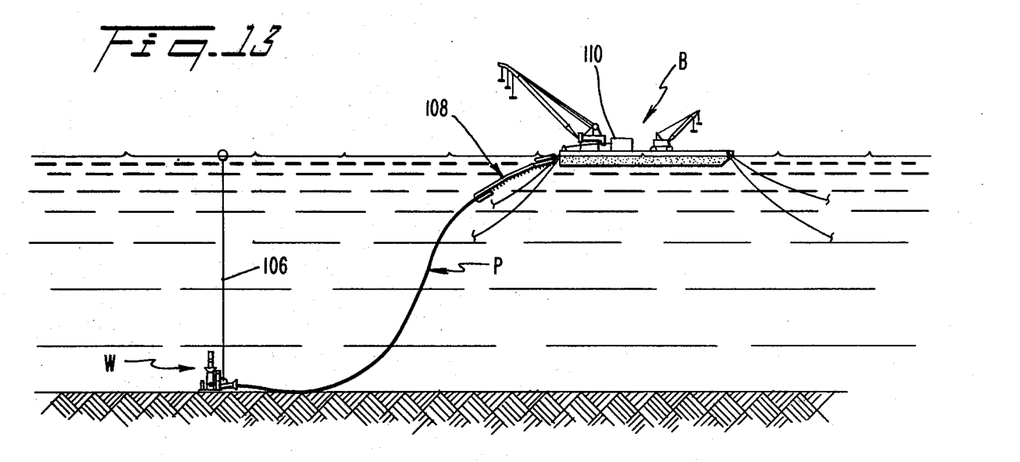
Figure 14:
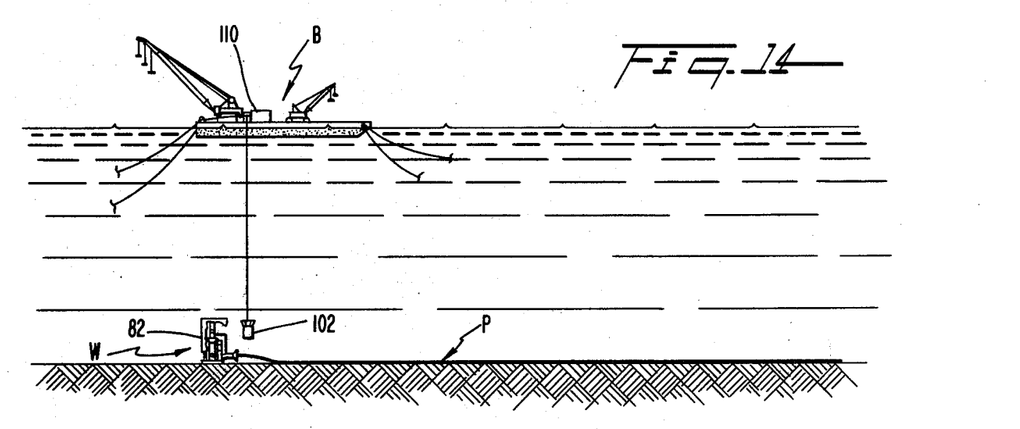

The barge B then proceeds to lay at least some of the pipeline means so that the pipeline means P lays generally on the submerged surface, extending away from the wellhead (FIGS. 13–14). Thereafter the pipeline may be lowered from barge B to the seabed on a recovery wire and the wire marked with a buoy for subsequent recovery. The barge B may then return to the wellhead and the work enclosure 82 be lowered. Divers, lowered in chamber 102, may proceed to connect the prefabricated flowline loops 52 between the pipelines and the wellhead equipment (FIG. 14).

Figure 15:
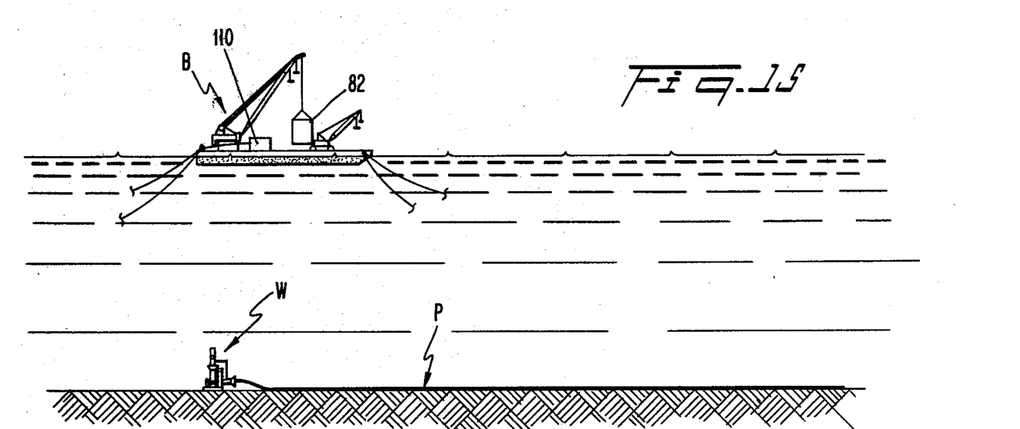

After proper hook-ups are made, divers and work enclosure are returned to the barge (FIG. 15). (The work enclosure may, if desired, be left at the wellhead as a permanent part of the wellhead and function to protect the wellhead and shelter divers). The barge then may return to the buoyed recovery wire, raises the pipeline means, and proceed with the lay operation in conventional fashion. Any tension on the pipeline which is produced during this subsequent laying procedure is resisted by the pin pile and is not transmitted to the wellhead.

In the event that an integrally formed work enclosure 80A (FIGS. 18, 19) is employed, such enclosure will be lowered with the flowline installation 12 and subsequent raising and lowering thereof is avoided.

SUMMARY OF MAJOR ADVANTAGES, UNOBVIOUSNESS AND SCOPE OF THE INVENTION

By virtue of the present invention, the wellhead base and the pipeline anchor are lowered and positioned on the seabed together as a unit, and pipeline installation can be accomplished without overstressing of the wellhead, since the pin pile isolates the wellhead and wellhead conductor pipe from forces applied to the pipeline anchor. Thus, the wellhead is isolated from forces applied to the pipeline anchor when pipeline means are installed, when pipeline means are subsequently laid away from the wellhead, and when thermal or other stresses are induced in the pipeline means. In addition, the pipeline anchor can be rotated to achieve proper orientation relative to the lay path of the pipeline.

The pipeline anchor is of enhanced utility in that it facilitates reception of pipeline means which are laid either toward or away from the wellhead.

Since the wellhead base and pipeline anchor are connected to one another, they will remain in generally proper spacial relation, thereby facilitating installation of the prefabricated flowline loops. In addition, the location of the articulation axis of the wellhead base/anchor means assembly outside of the socket and clamp and between the anchor means and base tends to insure the relative articulation of the anchor and wellhead will not unduly complicate final hook-up operations.

The indexing jig or ramp provides an enlarged target area for receiving a pipeline bundle and enables gravity to be utilized for properly aligning a pipeline when being laid toward the wellhead.

Unobviousness of the invention is evidenced by the failure of prior art, such as that noted at the outset of this disclosure, to suggest the articulated wellhead base/pipeline anchor concept, the pin pile, stress isolating concept, and the combination "lay away"/"lay toward" pipeline anchor means concept of the present invention.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. An offshore flowline installation assembly operable to receive pipeline means and comprising:
   wellhead base means;
   generally upright well conduit means projecting through said wellhead base means;
   pipeline anchor means connected with said wellhead base to form therewith a unit that can be lowered onto a seabed;
   said pipeline anchor means being shiftably positionable relative to said wellhead base means; and
   pin pile means operable to secure said pipeline anchor means to the seabed so as to isolate said pipeline anchor means from said wellhead base means in relation to forces transmitted from said pipeline means to said pipeline anchor means;
   said pin pile means defining generally upright pivot axis means about which said pipeline anchor means is rotatably shiftable; and
   said pin pile means being anchoringly engaged with said seabed and connected in generally lateral force isolating relation with said pipeline anchor means in order to substantially prevent the transmission of lateral force from said pipeline anchor means to said generally upright well conduit means.

2. An offshore flowline installation assembly according to claim 1, wherein:
   said pipeline anchor means comprises
   a socket for receiving and securing pipeline means laid away from said installation,
   said socket being rotatable about at least one axis; and
   said socket is rotatable about an upright axis located spaced from said socket.

3. An offshore flowline installation assembly according to claim 1, wherein:
   said pipeline anchor means includes
   clamp means for securing pipeline means laid toward said installation, and
   an inclined ramp means extending upwardly from the plane of said clamp means in a direction generally laterally relative to a pipeline lay path, so that pipeline means laid upon said ramp means tend to gravitate downwardly toward said clamp means.

4. An offshore flowline installation assembly according to claim 1, wherein:
   said pipeline anchor means comprises
   socket means adapted to receive and secure pipeline means laid away from said installation;
   clamp means for securing pipeline laid toward said installation; and
   ramp means extending upwardly from said clamp means so that pipeline means laid upon said ramp means tend to gravitate toward said clamp means; and
   said anchor means is rotatable about said pin pile means to selectively position one of said socket means and said clamp means for receiving said pipeline means.

5. An offshore flowing installation assembly according to claim 1, wherein:
   said pipeline anchor means includes
   pipeline securing means, and
   sleeve means supporting said pipeline securing means for rotation about an upright axis of said pin pile means.

6. An offshore flowline installation assembly according to claim 5, wherein:
   said wellhead base means includes means for preventing shifting thereof relative to the seabed; and
   said pipeline securing means is displaced from said axis of said pin pile means.

7. An offshore flowline installation assembly according to claim 6, wherein:
   said installation includes tubular means connected with said wellhead base means and operable to rotatably mount said sleeve means and telescopingly receive said pin pile means; and
   said shifting preventing means comprising cleats depending from said wellhead base means.

8. An offshore wellhead flowline installation comprising:
   generally upright well conduit means;
   wellhead base means through which said generally upright wellhead conduit means projects; and
   pipeline anchor means connected to said wellhead base means and comprising
   clamp means for securing pipeline means laid toward said installation, and
   inclined ramp means extending upwardly from said clamp means in a direction generally laterally relative to the lay path of the pipeline means, so that pipeline means laid upon said inclined ramp means tend to gravitate downwardly toward said clamp means;
   said inclined ramp means being disclosed generally laterally of said generally upright well conduit means and operable to receive said pipeline means with a longitudinal axis thereof being laterally displaced from said generally upright well conduit means and guide said pipeline means axis laterally toward said generally upright, well conduit means.

9. A flowline installation according to claim 8, wherein:
   said pipeline anchor means further comprises
   guide socket means for receiving pipeline means laid away from said installation; and
   said anchor means is selectively positionable to align one of said clamp means and said socket means with pipeline means.

10. A flowline installation according to claim 8 further including:

a pilot tube;
a pivot sleeve;
said pipeline anchor means being rigidly connected to said pivot sleeve;
a pin pile insertable through said pilot tube to secure said wellhead base means and said pipeline anchor means to a seabed and to isolate said wellhead base means from forces imparted to said pipeline anchor means from said pipeline means; and
said pivot sleeve being rotatably mounted on said pilot tube, permitting said pipeline anchor means to be rotated relative to said wellhead base means about an upright longitudinal axis of said pin pile.

11. A submersible wellhead flowline installation comprising:
a generally upright, well conduit means;
wellhead base means through which said generally upright well conduit means projects;
pipeline anchor means;
said wellhead base means and pipeline anchor means being connected together as a unit for simultaneous lowering onto a seabed;
pin pile means securing said unit to the seabed and operable to substantially isolate said pipeline anchor means from said wellhead base means in relation to forces generated in pipeline means connected with said pipeline anchor means;
said pipeline anchor means being movably rotatably positionable relative to said wellhead base means about an upright axis defined by said pin pile means; and
said pipeline anchor means including
first socket means for receiving pipeline means laid away from said installation and
second inclined ramp means for receiving pipeline means laid toward said installation
said second inclined ramp means being displaced generally laterally of said generally upright well conduit means and operable to receive said pipeline means with a longitudinal axis thereof being laterally displaced from said generally upright well conduit means and guide said pipeline means axis laterally toward said generally upright, well conduit means;
said pin pile means being anchoringly engaged with said seabed and connected in generally lateral force isolating relation with said pipeline anchor means in order to substantially prevent the transmission of lateral force from said pipeline anchor means to said generally upright well conduit means.

12. A submersible pipeline anchor comprising:
generally upright, well conduit means;
framework means;
clamp means on said framework means for receiving and securing pipeline means; and
inclined ramp means extending upwardly from said clamp means in a direction generally laterally of the lay path of the pipeline means, for supporting pipeline end means laid thereacross and guiding said pipeline end means as it gravitates toward said clamp means;
said inclined ramp means being displaced generally laterally of said generally upright well conduit means and operable to receive said pipeline means with a longitudinal axis thereof being laterally displaced from said generally upright well conduit means and guide said pipeline means axis laterally toward said generally upright well conduit means.

13. An offshore pipeline anchor comprising:
frame means;
means for mounting said frame means on a seabed for rotation about an upright axis;
socket means mounted on said frame means for pivotal movement about a horizontal axis, said socket means being operable to receive pipeline means laid away from said anchor; and
ramp means mounted on said frame means and being inclined relative to a horizontal plane, said ramp means being positionable generally laterally relative to the lay path of said pipeline means so that said pipeline means, when laid upon said ramp, gravitates downwardly therealong to a desired position.

14. A pipeline anchor according to claim 13 further including:
clamp means carried by said frame means;
said clamp means being located at the lower end of said ramp means to clamp pipeline means received from said ramp means.

15. A pipeline anchor according to claim 13 wherein:
said anchor means further includes
upright sleeve means journaled on said frame means; and
said mounting means comprises
pin pile means extending through said sleeve means into the seabed.

16. A pipeline anchor according to claim 13 wherein:
said anchor further includes
wellhead base means connected with said frame means to form a unit therewith that can be lowered to the seabed; and
said frame means is rotatable relative to said wellhead base means, about an upright axis.

17. An offshore flowline apparatus comprising:
an assembly located on a submerged surface and including
wellhead means, and
pipeline anchor means;
generally upright well conduit means included in said wellhead means;
isolating means operable to substantially isolate said pipeline anchor means from force transmitting communication with said wellhead means; and
pipeline means connected with said pipeline anchor means;
said isolating means being operable to substantially isolate said wellhead means from
forces generated between said pipeline means and said pipeline anchor means during said connecting, and
forces acting on said pipeline means and transmitted to said pipeline anchor means subsequent to said connecting;
said isolating means comprising means being anchoringly engaged with a seabed and connected in generally lateral force isolating relation with said pipeline anchor means in order to substantially prevent the transmission of lateral force from said pipeline anchor means to said generally upright, well conduit means.

18. A method of installing a subsea flowline installation comprising:
lowering onto a seabed an installation unit comprising wellhead base means and pipeline anchor means connected with said wellhead base means;

said pipeline anchor means being shiftably positionable relative to said wellhead base means;
providing generally upright well conduit means projecting through said wellhead base means;
connecting pipeline means to said pipeline anchor means;
prior to said connecting, inserting pin pile means through said pipeline anchor means and into the seabed so as to substantially isolate said wellhead base means from said pipeline anchor means in relation to forces transmitted from said pipeline means to said pipeline anchor means;
said pin pile means being anchoringly engaged with said seabed and connected in generally lateral force isolating relation with said pipeline anchor means in order to substantially prevent the transmission of lateral force from said pipeline anchor means to said generally upright well conduit means.

19. A method of installing a pipeline to a subsea anchor comprising:
positioning on the seabed an anchor means comprising
pipeline connector means and
inclined ramp means extending upwardly from said connector;
providing generally upright well conduit means displaced from said inclined ramp means;
orienting said anchor means such that said ramp means extends generally laterally relative to a lay path of pipeline means;
laying pipeline means along said lay path directed toward said anchor means; and
lowering said pipeline means across said ramp means so that said pipeline means tend to gravitate along said ramp means toward said connector means;
said inclined ramp means being displaced generally laterally of said generally upright well conduit means and operable to receive said pipeline means with a longitudinal axis thereof being laterally displaced from said generally upright well conduit means and guide said pipeline means axis laterally toward said generally upright well conduit means.

20. A method of installing a subsea wellhead and pipeline anchor installation, said method comprising
locating an assembly including wellhead means and a pipeline anchor means on a submerged surface;
providing generally upright well conduit means projecting through said wellhead means;
substantially isolating said pipeline anchor means from force transmitting communications with said wellhead means;
connecting pipeline means with said pipeline anchor means while
substantially isolating said wellhead means from forces generated between said pipeline means and pipeline anchor means during said connecting; and
substantially isolating said wellhead means from forces acting on said pipeline means and transmitted to said pipeline anchor means subsequent to said connecting said isolating being affected by
anchoringly engaging force isolating means with a seabed, with said force isolating means being connected in generally lateral force isolating relation with said pipeline anchor means in order to substantially prevent the transmission of lateral force from said pipeline anchor means to said generally upright well conduit means.

* * * * *